United States Patent [19]

Seidel

[11] 3,906,681
[45] Sept. 23, 1975

[54] MACHINE TOOL

[75] Inventor: William B. Seidel, Bloomfield Hills, Mich.

[73] Assignee: The Babcock & Wilcox Company, New York, N.Y.

[22] Filed: Aug. 27, 1973

[21] Appl. No.: 391,089

[52] U.S. Cl............ 51/165.92; 51/101 R; 90/11 R; 408/11
[51] Int. Cl............................................. B24b 49/16
[58] Field of Search.......... 51/101 R, 165 R, 165.8, 51/165.92, 165.93; 90/11 R; 408/8, 9, 10, 11

[56] References Cited
UNITED STATES PATENTS

| | | | |
|---|---|---|---|
| 2,975,566 | 3/1961 | Backet............................ | 51/165.92 |
| 3,415,017 | 12/1968 | Murray............................ | 51/135 R |
| 3,698,138 | 10/1972 | Wada............................... | 51/165.8 |
| 3,724,138 | 4/1973 | Ishikawa.......................... | 51/165.8 |
| 3,742,653 | 7/1973 | Kano................................ | 51/165.9 |
| 3,748,789 | 7/1973 | Wada............................... | 51/165.8 |

*Primary Examiner*—Harold D. Whitehead
*Attorney, Agent, or Firm*—J. M. Maguire, Esq.

[57] ABSTRACT

A machine tool wherein the work performed by the tool on a workpiece is continuously and instantaneously measured by the torque exerted by the tool and such measurement is utilized to control the work rate by control of the tool, or relative movement of the workpiece or tool or both for maximum tool work efficiency.

3 Claims, 7 Drawing Figures

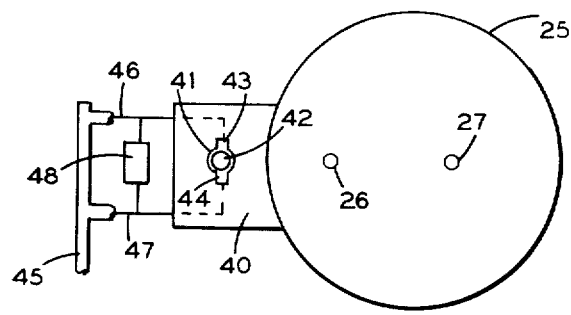
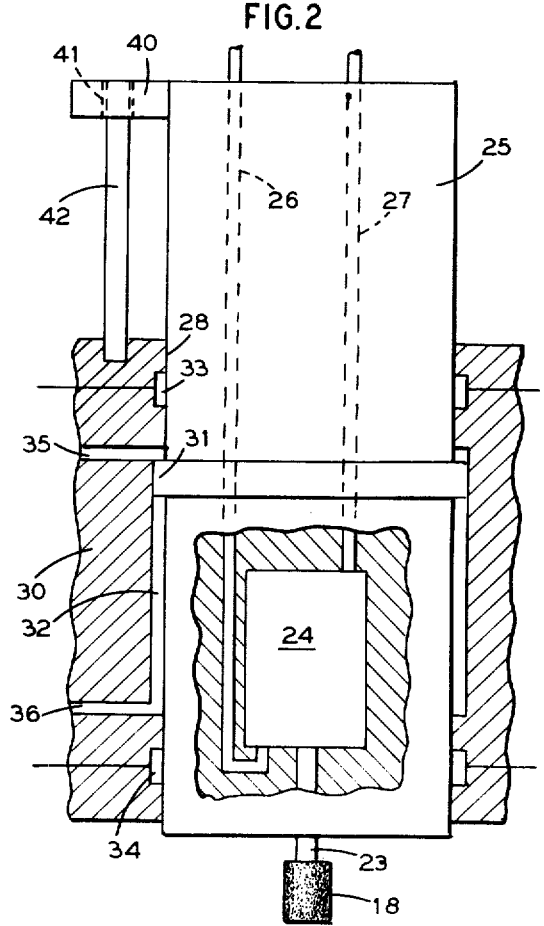

MACHINE TOOL

This invention relates to machine tools, and, more particularly, to machine tools utilized in the repetitive production of parts.

Machine tools are utilized for production purposes where similar raw parts are machined to the same configuration at the highest possible rates consistent with required quality. Many times the raw part is delivered to a machine tool, is machined and is finished in its final form on at least one surface.

The machining may be accomplished by grinding or cutting and while in theory the machine may be accurate to thousands of an inch, problems are sometimes encountered on lack of uniformity in the raw material supplied to the machine. For example, if the raw part is made from a casting, the surface to be machined may vary in hardness or thickness insofar as the machining operation is concerned.

In the present invention, I provide an apparatus which is applicable to a highly accurate machining operation where the cutting tool itself, whether a milling cutter or a grinding wheel, or the like, is used. The invention measures the working force applied at the point of contact between the machine tool and the workpiece so that the operation of the machine tool can be regulated to perform a substantially uniform working force at all times, regardless of the characteristics of the surface in the workpiece being machined.

For high production rates, it is necessary that such a machine tool arrangement be rigidly supported and all movements of either the machine tool or the workpiece relative to each other must be accurately controlled.

Of The Drawings:

FIG. 2, is a schematic elevation view, in section, showing the principles of the present invention;

FIG. 3, is a plan view, viewed from above, of the schematic arrangement shown in FIG. 2;

The invention is illustrated as applied in connection with a machine tool of the type disclosed and claimed in U.S. Pat. No. 3,750,345, issued Aug. 7, 1973, and having a common assignee with the present application. However, it will be noted that the present invention can be applied to other types of machine tools requiring high production rates and utilizing a grinding wheel or a cutting tool, as for example, a milling cutter.

Figure 1:
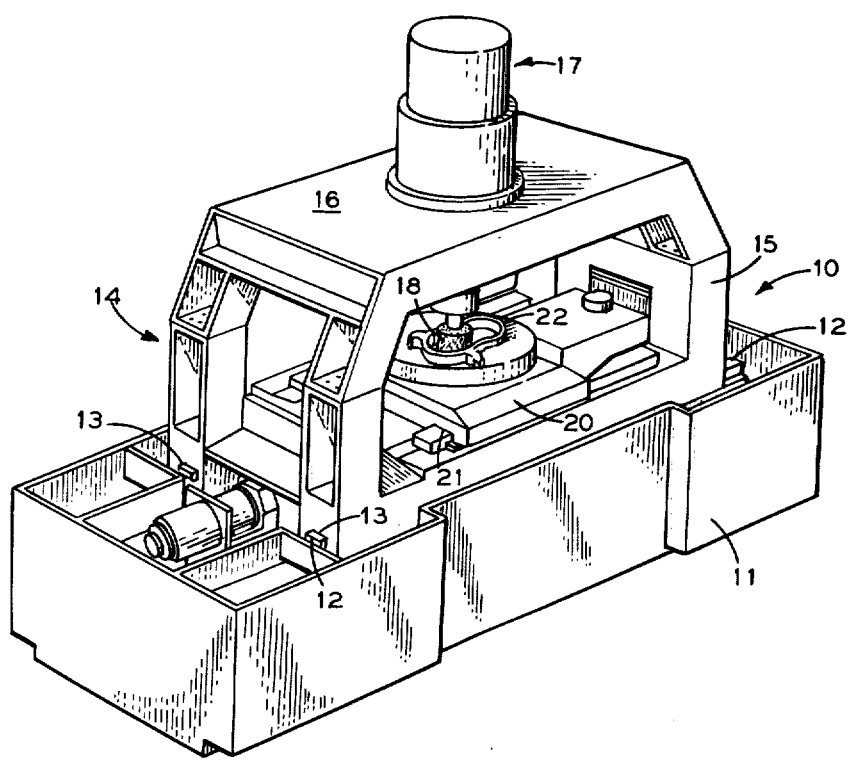
FIG. 1, is a perspective view of a machine tool incorporating the present invention.

As shown in FIG. 1, the assembly 10 includes a rigid base 11 having hydrostatic ways 12 formed in the upper portion thereof to engage in operative relationship a secondary slide 13 which is arranged for linear horizontal movement of a tool support structure 14. The hydrostatic bearing arrangement of the ways 12 permit essentially frictionless movement of the structure 14 in a horizontal direction as actuated by an electrohydraulic drive mechanism, described in detail in said patent.

The structure 14 includes upright corner posts 15 supporting an upper plate 16 on which is mounted the tool 17. In the embodiment shown, the tool 17 is represented by a grinding wheel 18 driven by a hydraulic motor, as hereinafter described.

Above the secondary slide 13 is mounted a primary slide 20 which is arranged for horizontal lineal movement in a plane parallel to the movement of the secondary slide where such movement occurs on hydrostatic bearings 21. With this structural arrangement any distortion due to unexpected forces, or inaccuracies in machine construction of the hydraulic ways of the slides 13 or 20 do not affect the operation of the primary slide 20 since any such distorted movement will be transmitted through the supporting structure 14 with comparable movement occurring in the primary slide 20. As shown, the workpiece 22 is mounted on the primary slide 20 for rotational movement, while the slide itself will provide any necessary lineal horizontal movement to accomplish the desired machining in the workpiece.

As described in detail in said patent, the electrohydraulic drive system of the two slides 13 and 20 are controlled to move the workpiece 22 and wheel 18 in a preselected pattern so that such movement of the workpiece 22 will accurately follow a pre-determined pattern as dictated by camming machinisms.

As is well-known in the machine tool industry, any machining operation has an optimum rate of removal from the workpiece. This rate is contingent upon many variables but can usually be established for a particular material with a particular tool.

In the illustrated example of the invention, a grinding wheel 18 is utilized to remove material from a workpiece 22. The rate of removal from the workpiece is determined by the depth of cut and the rate of relative movement between the cutting wheel and the workpiece. Under some conditions, it is desirable to obtain a relatively light cut, i.e., the depth of cut may be only a few thousandths of an inch, while the rate of relative movement between the tool and the workpiece may be substantial. Alternately, it is sometimes desirable to maintain a deep cut at a slow rate of relative movement between the grinding wheel and the workpiece. In either event, the desired rate of material removal can be considered as some fixed amount expressed as cubic inches per minute. This is indicative of the work rate of the tool.

Many times a deep cut at a relatively slow rate of movement between workpiece and wheel is desirable. Heretofore in the art, this cutting rate, or work rate, has been measured by measuring the horsepower input to the driving mechanism of the grinding wheel. This has been a fairly desirable guide for regulating the operation of a machine tool.

However, in my present invention, I have found it to be considerably more accurate and more reliable to measure the torque of the driving mechanism for the tool to determine the work rate and to thereby regulate the operations or rate of movement of the workpiece. By utilizing my torque control it is possible to actually increase the production rate of the machine tool. Since the system is so accurate, the tool may safely be operated very close to the maximum operating rate without danger to either the machine tool or the workpiece.

In FIG. 2, a schematic showing of my torque control is illustrated. As illustrated, it is assumed that a grinding wheel 18 is utilized, although it will be understood a milling cutter or other type of tool might be used. The wheel is maintained on a shaft 23 which is driven by a rotary fluid motor 24. The motor, in its housing, is non-rotary mounted in the body of housing or quill 25. The motor is supplied with pressure fluid for operational purposes through an inlet passageway 26 and an outlet passageway 27 in a manner hereinafter described in greater detail with respect to FIG. 4.

The housing 25 is essentially a cylinder fitted into a corresponding opening 28 in a stationary frame 30. The central portion of the housing is provided with a coaxial cylindrical flange 31 fitted into a cylindrical recess 32 formed in the opening 28. The coaxial relationship between the housing 25 and the opening 28 is established and maintained by hydrostatic bearing pads 33 and 34 positioned in the wall of the opening 28. The flange 31 serves as a piston in the recess 32 to permit axial movement thereof as dictated by the introduction and removal of hydrostatic fluid pressure through and from the fluid pressure connections 35 and 36.

In the construction so far described the housing 25 may be moved in a vertical direction by regulation of pressure fluid flow thourgh the connections 35 and 36, and the housing 25 could rotate in the frame 30 in practically frictionless condition. Under such conditions actuation of the fluid motor would not rotate the wheel 18, but merely spin the housing in the frame. To prevent rotation of the housing an arm 40 is provided to extend to one side of the housing 25. The arm is formed with an aperture 41 through which an upright post 42 is extended. The post 42 is rigidly attached to, and forms a part of the frame 30. The member 40 is provided with two diametrically opposite pressure pockets 43 and 44 essentially similar to hydrostatic bearings, as shown particularly in FIG. 3. The pockets are supplied with fluid from a common pressure fluid source 45 connected through capillary tubes 46 and 47 to restrict flow of fluid to the pockets. The exhaust or discharge from the pockets is to the atmosphere.

If a reactive torque is exerted on the housing 25, the resulting force tends to reduce the clearance between the post 42 and the arm 40. This difference in pressure is opposite to that of the torque exerted by the wheel 18. With the torque tending to move the arm 40 relative to the post 42, such force tends to reduce the clearance adjacent one pocket for example 43 and to increase the clearance for the opposite pocket for example 44. Such changes in clearance causes increased escape pressure from the pocket 43 while the escape pressure is reduced in the other pocket 44. This difference in pressure tends to keep the post 42 centrally aligned in the aperture 41 of arm 40. However, the difference in pressure between the pockets is a true measure of the force exerted due to the torque of the wheel 18. A pressure differential transducer 48 is utilized to convert the pressure differences to a proportional electrical value used to regulate the operation of the workpiece 22 rotation, either to increase or decrease the work performed by the wheel 18 in the grinding operation.

Figure 5:
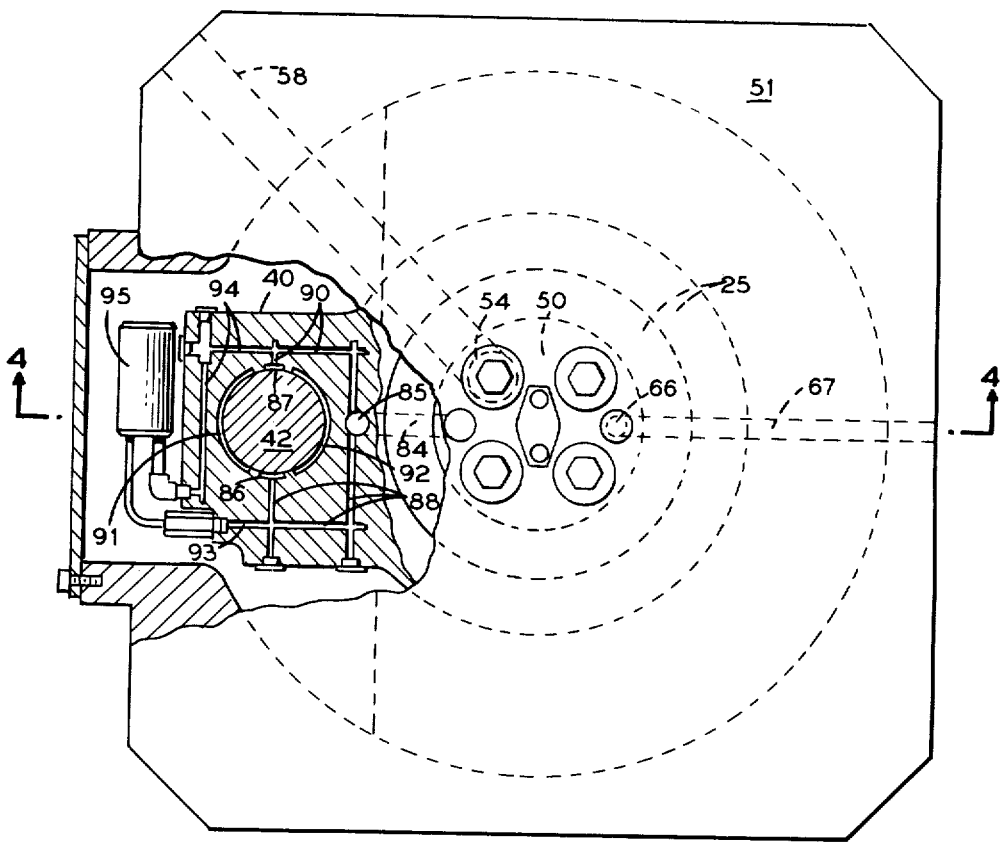
FIG. 5, is a plan view of the device shown in FIG. 4, with a portion of the apparatus shown in section.
Figure 6:
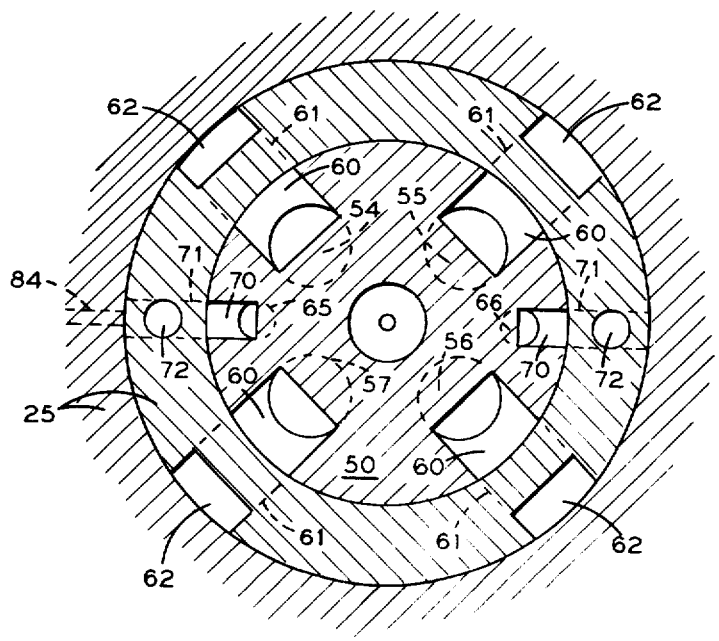
FIG. 6, is an enlarged section view taken along the line 6 — 6 of FIG. 4.

In the schematic description of the invention hereinafter described in connection with FIGS. 2 and 3, no provision has been made for the delivery of pressure fluid to the motor 24 without adversely affecting the accuracy of the torque measuring device represented by the post 42 and arm 40 shown in FIG. 2. Any flexible hose connection to the passageway 26 or 27 would drastically reduce or destroy the effectiveness of the torque measuring device. Moreover, for accuracy of the device of the invention it is highly desirable, if not essential, to maintain a frictionless relationship between the quill or housing 25 and the shaft 23 driving the wheel 18. The detailed structure to accomplish these purposes is shown in FIGS. 4 through 6.

Figure 4:
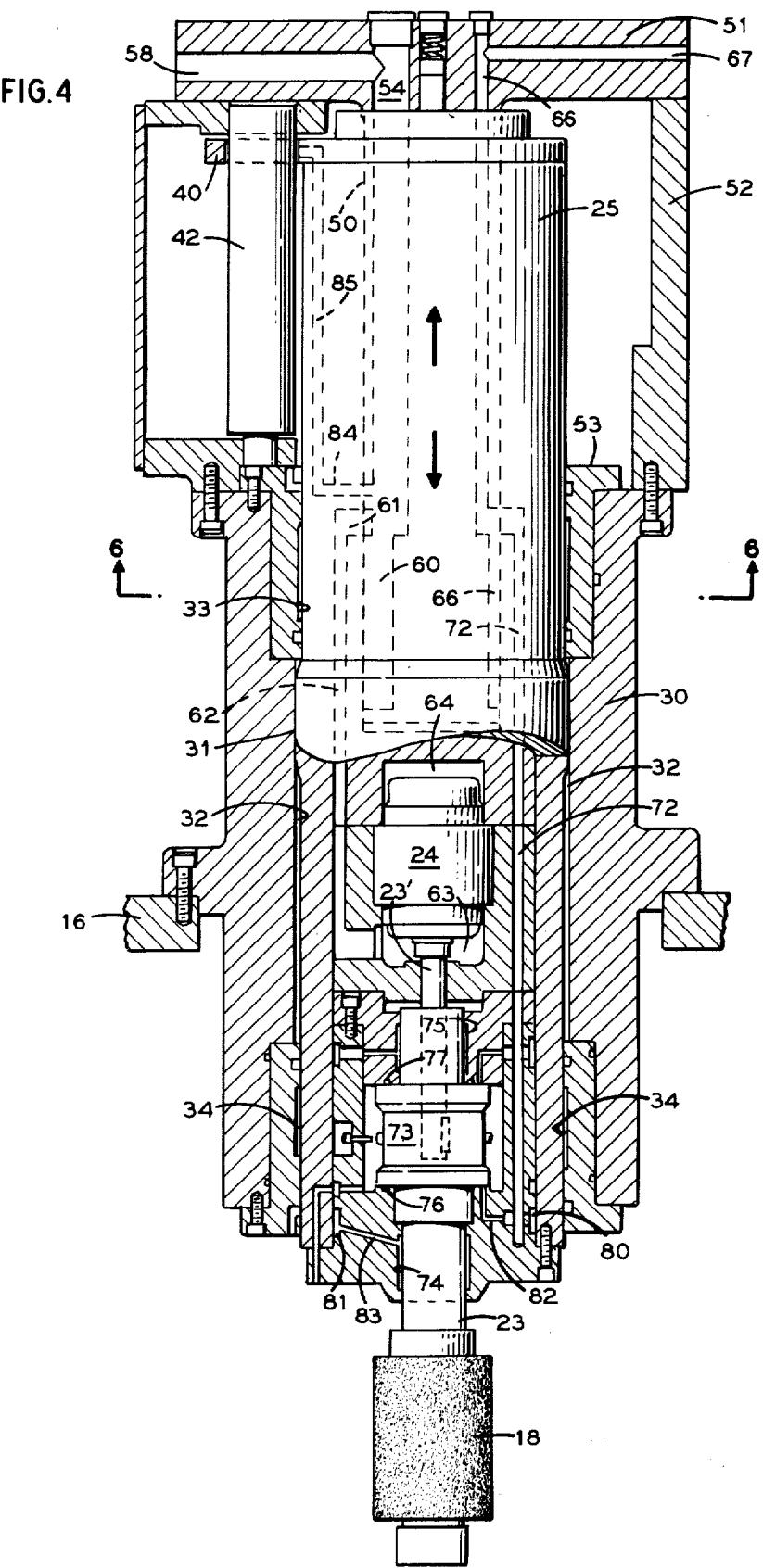
FIG. 4, is an elevation view, in section, of a portion of the apparatus shown in FIG. 1.

As shown particularly in FIG. 4 the quill or housing 25 is mounted in the frame 30, and is maintained in axial relationship therein by the longitudinally spaced hydrostatic bearings 33 and 34. The flange 31 vertically moveable in the cylinder 32 (inlet and outlet passages 35 and 36 are omitted in FIG. 4 for purposes of clarity) permits movement of the quill or housing 25 in a vertical direction, as described in connection with FIG. 2. The upper portion of quill or housing 25 is hollow and fitted with a depending cylinder 50 attached to a plate 51 mounted on the frame 30. The plate 51 is the top of an enclosure for the upper portion of the frame 30, including an upright hollow member 52, and also including a flanged insert 53 which may be dissembled to provide access to the housing 25. The parts are accurately machined and carefully assembled so that the depending cylinder 50 will closely fit, but permit particularly vertical movement between the outer surface of the cylinder 50 and the inner surface of the housing 25.

The cylinder is provided with four circumferentially spaced vertical holes, 54, 55, 56 and 57 extending downwardly from the opening to corresponding passageways 58 (only one shown) transversely formed in the plate 51. At a position above the lower end of the cylinder 50, a groove 60 formed in the surface of the cylinder merges either the lower end of the holes 54 and 56 and extends downwardly to a closed end.

A transversely positioned opening 61 in the inner wall of the housing 25 connects the groove 60 with an upright groove or passageway 62 formed in the wall of the housing 25 and leading to the fluid inlet end 63 of the motor 24. The passageways are proveded in duplicate for pressure equalization and provide pressure fluid inlets (only one described) to the motor 24, as is also shown schematically at 26 in FIG. 2. The discharge from the motor 24 passes from the chamber 64 through connecting passageways (not shown) including 62 and holes 55 and 57 to a sump (not shown).

The hydraulic fluid supply to the hydrostatic bearings, such as housing bearings 33 and 34, and others hereinafter described, is preferably separate from the described fluid supply to the motor 24. This is due to possible differences in the pressures required as the vast differences in the volume of fluid needed for the two types of service. While the bearings 33 and 34 can be supplied from the exterior of the device 17 and through the wall of the structure 30, other bearings connected with the shaft 23 and the motor 24 will be supplied through the cylinder 50. As shoen in FIGS. 5 through 6, pressure fluid will be supplied through vertical holes 65 and 66 and transverse inlet passageways 67 (only one shoen) formed in plate 51. In a manner similar to the connection passageways 60 and 61 leading to the fluid motor 24, the holes 65 and 66 merge into grooves 70, transverse connections 71 into passageways 72 drilled in a wall of the housing 25 (see FIG. 4).

In a structure shown in FIG. 4, the motor 24 is mounted rigidly in the quill or housing 25 with its shaft 23' keyed into a shaft 73 having an extension 23 attached to the wheel 18. Since the arm 40 restrains rotational movement of the housing 25 the shaft 23,23' must rotate relative to the housing with the least possible friction. This is accomplished by the use of hydrostatic bearings 74 and 75, and hydrostatic thrust bearings 76 and 77. The fluid for these bearings is supplied from the passageway 72 through circular collecting grooves such as 80 and 81, and connecting capillary tubes such as 82 and 83. As is well known in the art of hydrostatic bearings the flow of pressure fluid from the bearing is not usually specifically discharged through the clearance between the stationary and rotating parts supported by the bearings. Sometimes the direction of such discharge flow is directed to specific collecting points by the selective use of rubbing seals, or the like, but such is not used in the present machine assembly.

In the embodiment of the invention shown in FIGS. 4 and 5, the torque measuring device receives pressure fluid from passageway 72 by connector 84 and standpipe 85. From the upper end of pipe 85 pressure fluid is passed to the hydrostatic pads 86 and 87 by capillaries 88 and 90 respectively. The drain connections are indicated at 91 and 92. The capillary tubes 88 and 90 are provided with extension tubes 93 and 94, respectively, which lead to a differential pressure transducer 95 (also shown at 48 in FIG. 3).

As previously explained a reactive torque from the tool 18 is transmitted through the quill or housing 25 and causes minute angular motion of the arm 40. This motion changes the clearance between the post 42 and the hydrostatic pads 86 and 87. As the clearance changes, with one reducing and the other increasing, pressure is increased in the pad with less clearance and is decreased in the opposite pad so that a difference in pressure is developed. The difference in pressures between the pads is translated by the transducer into an electrical signal proportional to the tool working torque. The signal can the be utilized to control the rate of movement of the workpiece to maintain the optimum work rate on the workpiece.

Figure 7:
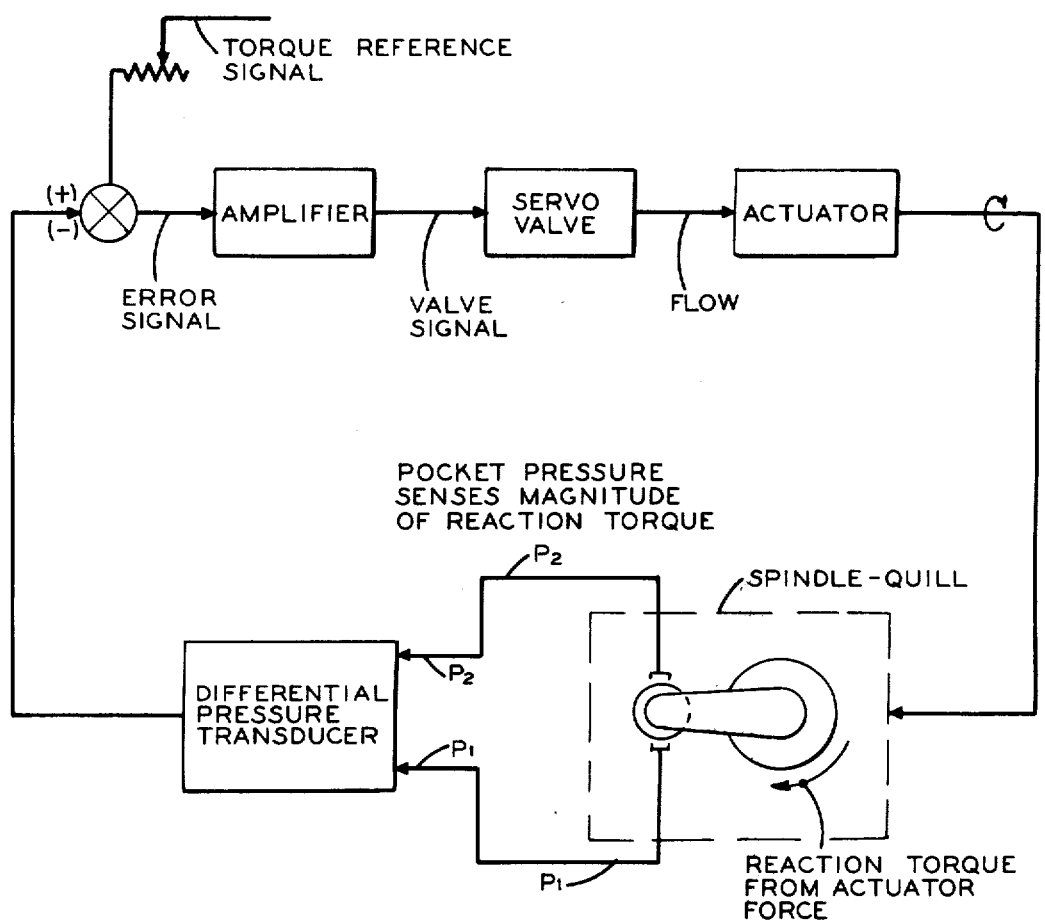
FIG. 7, is a diagram showing of a control system usable in the invention.

A diagramic showing of one arrangement of control for utilizing the reaction torque from the tool 18 is shown in FIG. 7. As shown, the output from the differential pressure transducer is fed into a summing unit which also receives the output from an adjustable reference torque value. The resultant error value is passed through an amplifier to servo value and an actuator to control the operation of either the workpiece drive or the tool positioning mechanism. The end result of the control would alter the work rate of the tool 18 in response to the reaction torque to maintain high efficiency of the tool.

What is claimed is:

1. A machine tool having means for mounting a workpiece, means for mounting a machine tool in operative relationship to the workpiece, and means for effecting relative movement of the machine tool and the workpiece to shape the workpiece to a predetermined configuration, the improvement comprising means for engaging the machine tool and the workpiece to effect work on the workpiece, means for continuously measuring the instantaneous work being performed by the machine tool on the workpiece, including power means directly connected with the machine tool to drive the tool at a controlled rate of rotation, the power means mounted in a housing with the housing substantially friction-lessly supported in a stationary frame forming a portion of the tool mount, a post extending from the frame, an arm radially attached to the housing cooperating with the post to restrain rotation of the housing, pressure sensitive pads positioned between the arm and post to measure the torque exerted by the machine tool on the workpiece, and means responsive to the measurement of torque to regulate the relative movement between tool and workpiece to maintain a predetermined work rate therebetween.

2. A machine tool according to claim 1 wherein the power means includes a hydraulic motor.

3. A machine tool according to claim 2 wherein the substantially frictionless housing support in the frame includes hydrostatic bearings.

* * * * *